C. H. KICKLIGHTER.
ELECTRIC WELDING.
APPLICATION FILED DEC. 18, 1911.
1,070,966.
Patented Aug. 19, 1913.
2 SHEETS—SHEET 1.
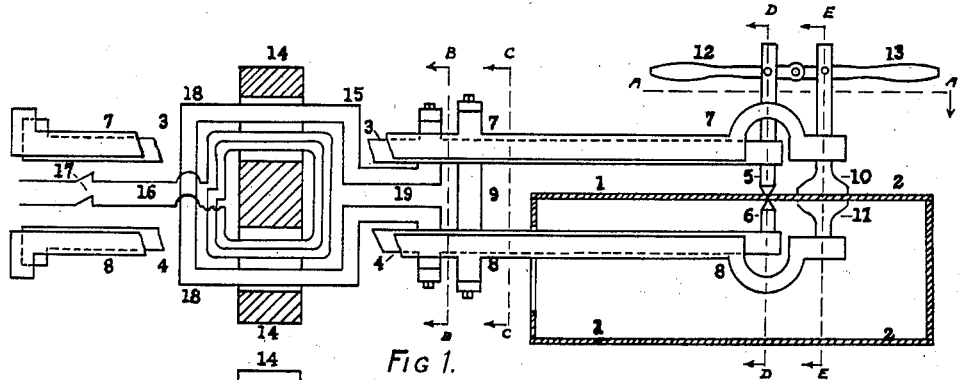
FIG 1.
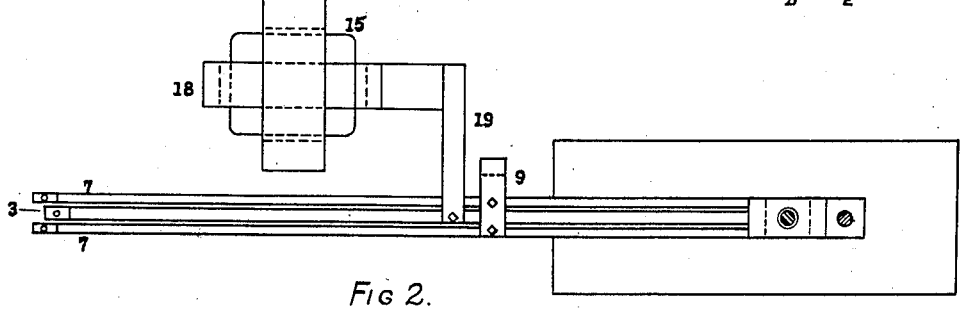
FIG 2.
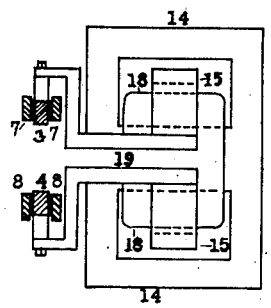  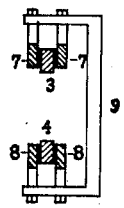  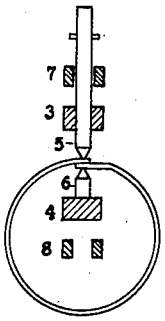  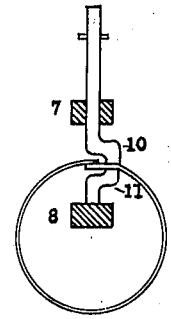
FIG 3.   FIG 4.   FIG 5.   FIG 6.
WITNESSES:
INVENTOR
Charles H. Kicklighter.

C. H. KICKLIGHTER.
ELECTRIC WELDING.
APPLICATION FILED DEC. 18, 1911.
1,070,966.
Patented Aug. 19, 1913.
2 SHEETS—SHEET 2.
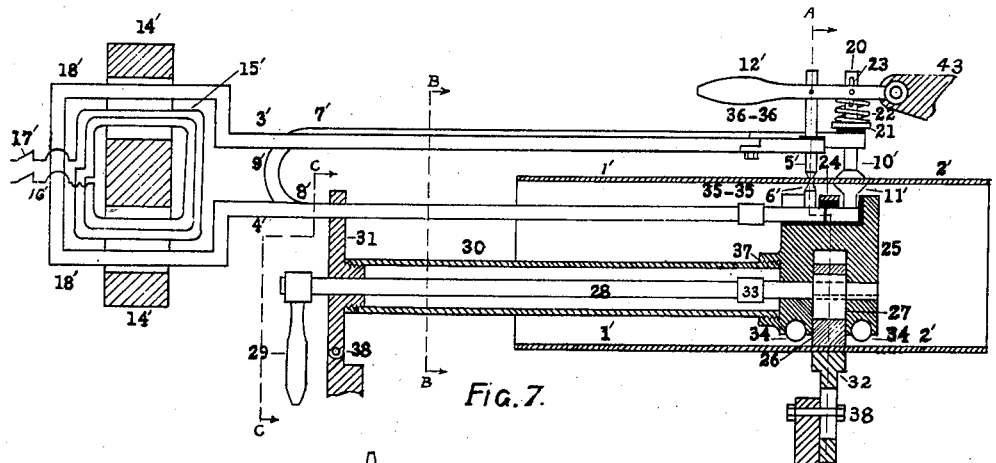
Fig. 7.
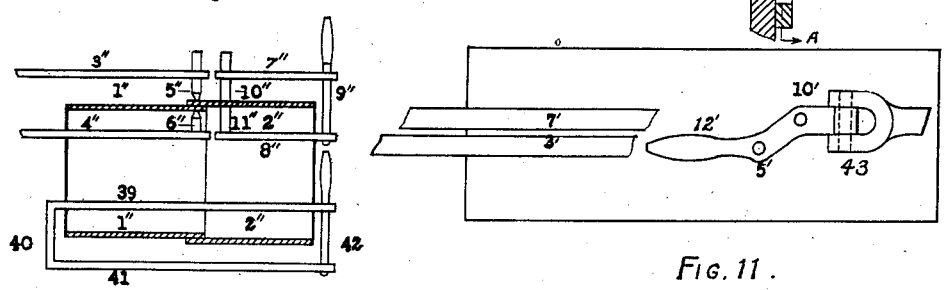
Fig. 12.
Fig. 11.
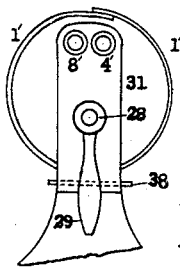
Fig. 10.
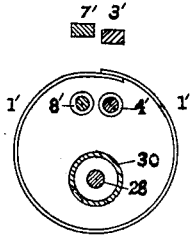
Fig. 9.
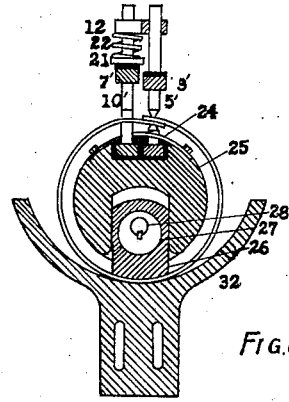
Fig. 8.
WITNESSES:
INVENTOR
Charles H. Kicklighter.

UNITED STATES PATENT OFFICE.

CHARLES H. KICKLIGHTER, OF PASADENA, CALIFORNIA.

ELECTRIC WELDING.

1,070,966.  Specification of Letters Patent.  Patented Aug. 19, 1913.

Application filed December 18, 1911. Serial No. 666,636.

*To all whom it may concern:*

Be it known that I, CHARLES H. KICKLIGHTER, a citizen of the United States, residing at Pasadena, in the county of Los Angeles and State of California, have invented new and useful Improvements in Electric Welding, of which the following is a specification.

This invention relates to apparatus for use in connection with electric welding by means of alternating current.

It is often desirable to weld joints, in such objects as iron pipes and boiler shells, where the path of the alternating current is linked with a mass of magnetic material. It has been found that the self-inductance, due to the heavy flux induced in the iron shells of such objects, interferes materially with the operations; and it is also noted that much of the electrical energy is wasted on account of the eddy or induced currents set up in said shells. In the present art, after a comparatively short section of pipe has been welded together, it has been found impossible to further continue the process.

The primary object of this invention is to provide means for opposing the flow of the magnetic flux which produces the induced counter-pressure. Another object is to provide means for reducing the eddy or induced currents, and, consequently, the energy consumed in the welding operations. As a result of these improvements, it is believed that it will be easy to weld steel pipe of much greater lengths and iron shells of larger dimensions than is at present possible, and that the economy of such operations will be greatly increased. The method employed for attaining the above results are: First,—linking a short-circuited coil, preferably of one turn and of low electrical resistance, with the magnetic material in which the welding current induces flux, so that the induced current in said short-circuited member will oppose the flow of the flux. Second,—placing the above short-circuited member in close proximity to the conductors which carry the welding current, so as to counteract the tendencies of said welding current to set up eddy currents in the pipe or shell.

Other objects and advantages of my invention will hereinafter appear, and the novel features thereof will be specifically pointed out in the appended claims.

In order that my invention and some of the ways in which it can be applied may be clearly understood, reference is had to the accompanying drawings forming a part of this specification, and in which:—

Figure 1 is a front view, partially sectioned, illustrating one form of my invention; Fig. 2 is a top view of Fig. 1, partially sectioned along the lines AA. Fig. 3 is a transverse section along line BB of Fig. 1 looking toward the transformer. Fig. 4 is a transverse section along line CC of Fig. 1. Fig. 5 is a partial transverse section along line DD of Fig. 1. Fig. 6 is a partial transverse section along line EE of Fig. 1. Fig. 7 is a front view, partially sectioned, illustrating another form of my invention. Fig. 8 is a transverse section along line AA of Fig. 7. Fig. 9 is a transverse section along line BB of Fig. 7. Fig. 10 is a partial end view along line CC of Fig. 7. Fig. 11 is a partial top view of Fig. 7. Fig. 12 is a diagrammatic sketch illustrating another method of applying the invention.

Reference will now be had to Figs. 1, 2, 3, 4, 5, and 6. A steel pipe or iron shell 1—1—2—2— is to be riveted up by heavy alternating current conveyed by conductors 3 and 4 from a step-down transformer to the welding terminals 5 and 6. It has been found that heavy flux passes around through portion 1—1 of the iron shell to the left of the welding terminals. Heavy conductors 7 and 8, connected by yoke 9 at the ends adjacent to the transformer and by auxiliary terminals 10 and 11 through the iron shell, are linked about the same magnetic material as that inclosed by the welding current circuit.

When the welding current flows in conductors 3—4, a heavy current will be induced in conductors 7—8 which will oppose the setting up of flux in the iron shell or pipe, reduce the self-induced counter-pressure of the welding current and permit a heavy welding current to flow.

Handle 12 is provided for bringing the welding point 5 against the iron shell. Handle 13 is suitable for pressing down the auxiliary terminal 10.

The transformer core 14—14 is provided with a primary winding 15, connected by leads 16 through switch 17 to the supply, and also with a single turn secondary 18 connected by leads 19 with the conductors 3 and 4.

The transformer is offset to one side, so that the conductors 3—4 for the welding current and the conductors 7—8 for the induced or compensating current may be elongated and made adjustable to accommodate the various lengths of pipe. The yoke 9 and the leads 19 may be attached by set screws or otherwise to conductors 7—8 and 3—4 respectively, at various points. In Fig. 1, these conductors are shown torn away just in front of the transformer, for the sake of clearness. The auxiliary terminals 10—11 are made with a large contact surface so as to introduce as small a resistance as possible in the circuit with conductors 7—8.

Fig. 3 is a transverse section along axis BB of Fig. 1, looking toward the transformer. This gives an end view of the transformer and shows clearly the method of connecting the transformer secondary 18—18 to the conductors 3—4 by means of leads 19. The compensating-current conductors 7—7 and 8—8 are spaced on either side of the welding current conductors 3—4, respectively, from which they are separated by insulation. The object of this construction is to permit the currents which flow in conductors 7—7 and 8—8 to neutralize the tendency of the welding currents in conductors 3 and 4, respectively, to form eddy currents in the iron shell or other contiguous material.

Fig. 4 is a section along axis CC of Fig. 1, and illustrates the connection of conductors 7—7 to 8—8 by yoke 9.

Fig. 5 is a section along axis DD of Fig. 1. Conductors 7—7 and 8—8 are separated some distance from conductors 3 and 4 respectively, so that electrical connection may be the more easily made between these latter by operating the movable contact 5.

Fig. 6 is a section along axis EE of Fig. 1. The conductors 7 and 8 are shown electrically connected by contacts 10 and 11. It is preferable to off-set these contacts so that they press upon a single thickness of metal. Otherwise conductors 7—8 may serve as a shunt between welding terminals 5 and 6.

To operate, bring a section of pipe or shell into position, adjust so that a portion of the joint to be welded falls between the welding terminals 5 and 6 and that a single thickness of metal falls between compensating-current terminals 7 and 8, bear down on handle 13 so as to form good electrical connection from 7 to 8, bear down on handle 12 so as to establish electrical connection between 5 and 6. A heavy welding current flows from the transformer secondary 18 through the conductor 3, the terminal 5, the shell between 5 and 6, the terminal 6 and the conductor 4 back to the secondary 18. At the same time the magnetic flux in the annular portion 1—1 of the iron shell induces a current in conductor 7, yoke 9, conductor 8, terminal 11, the shell between 11 and 10, the terminal 10 back to the conductor 7. The direction of this latter current is opposite in direction to the welding current. Its effect is to prevent self-induction and eddy currents from interfering with the effectiveness of the welding current. The resistance of the path for the compensating current should be as low as possible in order that the value of this current may be as near that of the welding current as possible and in order that the energy consumption may be a minimum. The resistance of the welding current path should also be very low, except at the point where it passes through the iron shell. Here the resistance of the metals to the passage of the current causes the development of sufficient heat to bring the edges of the iron shell to a welding heat.

Reference will now be had to Figs. 7, 8, 9, 10 and 11. These represent a slight modification of the invention in which the welding terminal 6' and the auxiliary terminal 11' are supported within the shell or pipe by special means. In very long sections of pipe the lack of rigidity of the support for these terminals becomes quite a problem. I have recourse to a head or mounting which loosely fits the inside of the pipe and carries the terminals 6' and 11'. When ready to operate, this may be raised so as to bring the terminals into contact with the shell and form a rigid support for them through the lower part of the shell. A notation is given the parts of these drawings similar to that of those already described. 1'—1'—2'—2' denote portions of the shell, 3' and 4' are the conductors for the welding current, 5' and 6' are the welding terminals, 7' and 8' are the conductors for the compensating current, 9' is the connecting yoke, 10' and 11' are the auxiliary terminals. One handle 12' is provided for pressing both terminals 5' and 10' against the iron shell. Both terminals are insulated from the handle 12'. Terminal 10' is provided with an upper stem 20 having a collar 21, a compression spring 22 and a slot 23. When the handle 12' is lowered, terminal 10' first comes into contact with the iron shell, further motion of the handle compresses spring 22 against the collar 21 until welding terminal 5' touches the shell. When the handle is raised terminal 5' first breaks contact, as the handle is then further raised the pin through the lever 12' reaches the top of the slot 23 in the stem 20 and the terminal 10' is also raised from the shell.

14'—14' is the transformer core provided with primary 15' connected through leads 16' and switch 17' to the supply. The single turn secondary 18'—18' is connected to the conductors 3' and 4'. The welding terminal 6' and the auxiliary terminal 11' are fastened by a strap 24 to the mounting body 25. Within this body moves a jaw 26, which may be moved in or out by means of an eccentric 27 mounted on a shaft 28 and operated by a handle 29. The mounting 25 is supported rather flexibly by a hollow tube 30, screwed at one end to the mounting and at the other end to the standard 31. This standard also carries a bearing for the shaft 28 and supports for the conductors 4' and 8'. The standard is pivoted to the frame of the machine at 38. Beneath the mounting 25 is a stirrup support 32, attached to the frame of the machine, and adapted to fit around the shell and afford a rigid support through the shell to the mounting 25 and the terminals 6' and 11' when the eccentric jaw 26 is forced out. Interchangeable stirrups for various diameters of shells may be provided. When the mounting 25 is lowered, the ball bearings 34—34 take the weight of the mounting and decrease the friction against the lower part of the shell when this shell is moved. It is evident that the mounting might always rest against the bottom of the shell while the eccentric jaw is reversed and made to carry the terminals 6' and 11', so as to raise or lower them relative to the mounting and to the shell. Shaft 28 is provided with a sleeve 33, conductors 4'—8' with sleeves 35—35, conductors 3'—7' with joints 36—36 and tube 30 with threads at 37. These permit elongating pieces to be inserted in these various parts and make the apparatus adjustable for any length of cylindrical shell. Since the mounting 25 can be easily removed and replaced by one of different size, or since jaw 26 can be removed and replaced by one of different length, and since stirrup support 32 can be raised and lowered or replaced by another, it is seen that the apparatus is also adjustable for any diameter of cylindrical shell.

Fig. 8 is a transverse section along A'—A' of Fig. 9, and shows more clearly the relation of the parts of the mounting and the terminals.

Fig. 9 is a transverse section along axis BB of Fig. 9. Sections of conductors 3', 4', 7' and 8' are shown, also the shaft 28 and the inclosing tube 30.

Fig. 10 is a partial view from the axis CC showing the standard 31 and the handle 29 for operating the shaft 28. Supporting bushings for conductors 4' and 8' are also shown.

Fig. 11 is a partial top view illustrating the shape of the lever 12' and its fulcrum bearing at 43 on the frame of the machine. Terminals 5' and 10' are staggered in the manner shown so that they are neither in the same transverse plane nor the same longitudinal plane relative to the cylindrical shell. The object of this is to adapt the machine for welding either transverse or longitudinal joints by causing the auxiliary terminal 10' to fall on a single thickness of shell when the welding terminal 5' rests on the joint.

The operation of the apparatus is similar to that already described. Bring a section of pipe or shell into position, adjust so that a portion of the joint to be welded falls between the welding terminals 5' and 6' and that a single thickness of metal falls between compensating-current terminals 7' and 8'. The handle 29 should now be moved through about 180° into the position shown. The eccentric 27 will force jaw 26 downward so as to come in contact with the shell and raise the mounting 25 upward until the terminals 6' and 11' press firmly against the shell. The handle 12' should now be forced down. This will first cause auxiliary terminal 10' to make contact with the shell directly opposite terminal 11'. A further motion of the handle 12' will compress spring 22 and bring welding terminal 5' in contact with the shell directly opposite terminal 6'. A heavy welding current flows from the transformer secondary 18' through the conductor 3', the terminal 5', the shell between 5' and 6', the terminal 6' and the conductor 4' back to the secondary 18'. At the same time that the magnetic flux in the annular portion 1'—1' of the iron shell induces a current in conductor 7', yoke 9', conductor 8', terminal 11', the shell between 11' and 10', the terminal 10' back to the conductor 7'. The direction of this latter current is opposite in direction to the welding current. Its effect is to prevent self-inductance and eddy currents from interfering with the effectiveness of the welding current.

Fig. 12 is a diagrammatic sketch illustrating modification of the invention. Conductors 3'' and 4'' convey the welding current from a source, not shown, to welding terminals 5'' and 6''. The alternating flux which tends to flow through the upper portion 1'' of the iron shell is prevented from taking a return path through portions 1''—2'' at the bottom of the shell by the reaction of the closed circuit 39—40—41—42, and is prevented from taking a return path through portion 2'' at the upper right hand side of the shell by the reactance of the closed circuit 7''—10''—11''—8''—9''. In this latter circuit 7'' and 8'' are conductors connected at one end by switch 9'' and at the other by the terminals 10''—11'' through the plate. The other auxiliary-current circuit consists of two conductors 39 and 41 connected at one end by yoke 40 and at the other by switch 42. The switches 9'' and 42 are necessary to permit of the introduction of sections of pipe.

The operation of above is similar to the explanation previously given. When the welding current passes through conductor 3'', terminals 5'' and 6'' and conductor 4'', currents are induced in both circuits 7''—

10″—11″—8″—9″ and 39—40—41—42, and the reaction of these currents opposes the flow of flux and, therefore, removes the self-inductance of the welding current.

What I claim is:

1. In combination with an apparatus for electric welding comprising conductors for carrying the welding current around metallic material, of means for opposing the flow of magnetic flux linked with the current in said conductors.

2. In combination with an apparatus for electric welding comprising conductors for carrying the welding current around metallic material, of means for opposing the self-inductance of the current in said conductors.

3. In combination with an apparatus for electric welding comprising conductors for carrying the welding current around metallic material, of means for counteracting the counter pressure due to self-inductance of the current in said conductors.

4. In combination with an apparatus for electric welding, comprising conductors for carrying the welding current around metallic material, of other conductors short circuited and adapted to carry a current induced by said welding current.

5. In combination with an apparatus for electric welding comprising conductors for carrying the welding current around metallic material, of means for preventing the inducing of eddy currents by the welding current in said conductors.

6. In combination with an apparatus for electric welding comprising conductors for carrying the welding current, of other conductors in close proximity to said former conductors and carrying a current opposite in direction to the welding current in these conductors.

7. In combination with an apparatus for electric welding comprising conductors for carrying the welding current, of other conductors short-circuited, in close proximity to said former conductors and adapted to carry a current opposed in direction to the welding current.

8. In combination with an apparatus for electric welding comprising conductors for carrying the welding current around metallic material, of other conductors short-circuited around said metallic material.

9. In combination with an apparatus for electric welding comprising conductors for carrying the welding current through and within a portion of a hollow cylinder of metallic material, of other conductors short-circuited upon each other, one of said latter conductors passing through and within the same portion of the hollow cylinder.

10. In combination with an apparatus for electric welding comprising conductors for carrying the welding current around metallic material, of other conductors adapted to prevent the inducing of eddy currents in said metallic material by the welding current.

11. In an apparatus for electric welding comprising conductors for carrying and terminals for applying the welding current, of a mounting for supporting one of the terminals within a cylindrical shell and of means for expanding the mounting within the shell.

12. In an apparatus for electric welding comprising conductors for carrying and terminals for applying the welding current, of means for giving a rigid support to the terminals within a cylindrical shell, said means being capable of adjustment for shells of various diameters.

13. In an apparatus for electric welding comprising conductors for carrying and terminals for applying the welding current, of means for giving a rigid support to the terminals within a cylindrical shell, and of means of adjusting to accommodate shells of various lengths.

14. In an apparatus for electric welding comprising conductors for carrying and terminals for applying the welding current, of means for supporting one of the terminals within a cylindrical shell and of means for breaking or making contact between this terminal and the shell.

15. In an apparatus for electric welding comprising conductors for carrying and terminals for applying the welding current, of means for supporting one of these terminals within a cylindrical shell and of means for increasing the rigidity of this support.

In testimony whereof I have hereunto signed my name in the presence of two subscribing witnesses at Pasadena, in the county of Los Angeles and State of California, this 7th day of December, 1911.

CHARLES H. KICKLIGHTER.

Witnesses:
C. V. STURDEVANT,
ANNA E. SKINNER.